US009702554B2

(12) United States Patent
Comrie

(10) Patent No.: US 9,702,554 B2
(45) Date of Patent: *Jul. 11, 2017

(54) SORBENTS FOR COAL COMBUSTION

(71) Applicant: NOx II, Ltd., Itasca, IL (US)

(72) Inventor: Douglas C. Comrie, Cape Coral, FL (US)

(73) Assignee: NOx II, Ltd., Itasca, IL (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/877,145

(22) Filed: Oct. 7, 2015

(65) Prior Publication Data

US 2016/0025337 A1 Jan. 28, 2016

Related U.S. Application Data

(63) Continuation of application No. 14/254,379, filed on Apr. 16, 2014, now Pat. No. 9,169,453, which is a continuation of application No. 14/036,036, filed on Sep. 25, 2013, now Pat. No. 8,703,081, which is a continuation of application No. 13/679,775, filed on Nov. 16, 2012, now Pat. No. 8,545,778, which is a continuation of application No. 13/343,491, filed on Jan. 4, 2012, now Pat. No. 8,313,323, which is a continuation of application No. 13/169,187, filed on Jun. 27, 2011, now Pat. No. 8,114,368, which is a continuation of application No. 12/839,154, filed on Jul. 19, 2010, now Pat. No. 7,988,939, which is a continuation of application No. 12/705,196, filed on Feb. 12, 2010, now Pat. No. 7,776,301, which is a continuation of application No. 12/351,191, filed on Jan. 9, 2009, now Pat. No. 7,674,442, which is a continuation of application No. 11/377,528, filed on Mar. 16, 2006, now Pat. No. 7,507,083.

(60) Provisional application No. 60/662,911, filed on Mar. 17, 2005.

(51) Int. Cl.
| | | |
|---|---|---|
| *B01D 53/64* | (2006.01) | |
| *F23J 7/00* | (2006.01) | |
| *B01D 53/30* | (2006.01) | |
| *B01J 20/04* | (2006.01) | |
| *B01J 20/16* | (2006.01) | |
| *C10L 9/10* | (2006.01) | |
| *F23K 1/00* | (2006.01) | |
| *B01D 53/48* | (2006.01) | |
| *F23J 15/00* | (2006.01) | |
| *C10L 10/00* | (2006.01) | |
| *B01J 20/06* | (2006.01) | |
| *C10L 10/02* | (2006.01) | |
| *F23J 15/02* | (2006.01) | |
| *F23J 15/04* | (2006.01) | |

(52) U.S. Cl.
CPC .............. *F23J 7/00* (2013.01); *B01D 53/30* (2013.01); *B01D 53/485* (2013.01); *B01D 53/64* (2013.01); *B01J 20/041* (2013.01); *B01J 20/043* (2013.01); *B01J 20/046* (2013.01); *B01J 20/06* (2013.01); *B01J 20/16* (2013.01); *C10L 9/10* (2013.01); *C10L 10/00* (2013.01); *C10L 10/02* (2013.01); *F23J 15/00* (2013.01); *F23J 15/025* (2013.01); *F23J 15/04* (2013.01); *F23K 1/00* (2013.01); *B01D 2257/602* (2013.01); *B01J 2220/42* (2013.01); *F23K 2201/505* (2013.01); *Y10S 423/05* (2013.01)

(58) Field of Classification Search
CPC .............. B01D 53/64; B01D 2257/602; B01D 2258/0283
See application file for complete search history.

(56) References Cited

U.S. PATENT DOCUMENTS

| | | |
|---|---|---|
| 174,348 A | 3/1876 | Brown |
| 202,092 A | 4/1878 | Breed |
| 208,011 A | 9/1878 | Eaton |
| 224,649 A | 2/1880 | Child |
| 229,159 A | 6/1880 | McCarty |
| 298,727 A | 5/1884 | Case |
| 346,765 A | 8/1886 | McIntyre |
| 347,078 A | 8/1886 | White |
| 367,014 A | 7/1887 | Wandrey et al. |
| 537,998 A | 4/1895 | Spring et al. |
| 541,025 A | 6/1895 | Gray |
| 625,754 A | 5/1899 | Garland |
| 647,622 A | 4/1900 | Vallet-Rogez |
| 685,719 A | 10/1901 | Harris |
| 688,782 A | 12/1901 | Hillery |
| 700,888 A | 5/1902 | Battistini |
| 744,908 A | 11/1903 | Dallas |
| 846,338 A | 3/1907 | McNamara |
| 894,110 A | 7/1908 | Bloss |
| 896,876 A | 8/1908 | Williams |
| 911,960 A | 2/1909 | Ellis |
| 945,331 A | 1/1910 | Koppers |
| 945,846 A | 1/1910 | Hughes |
| 1,112,547 A | 10/1914 | Morin |

(Continued)

FOREIGN PATENT DOCUMENTS

| | | |
|---|---|---|
| CA | 202056 A | 7/1920 |
| CN | 1177628 A | 4/1998 |

(Continued)

OTHER PUBLICATIONS

Withum et al., "Characterization of Coal Combustion By-Products for the Re-Evolution of Mercury into Ecosystems," Consol Energy Inc., Research and Development, Mar. 2005.

(Continued)

*Primary Examiner* — Timothy Vanoy
(74) *Attorney, Agent, or Firm* — Harness, Dickey & Pierce, P.L.C.

(57) ABSTRACT

Sorbent compositions containing iodine are added to coal to mitigate the release of mercury and/or other harmful elements into the environment during combustion of coal containing natural levels of mercury.

20 Claims, No Drawings

(56) References Cited

U.S. PATENT DOCUMENTS

| | | |
|---|---|---|
| 1,167,471 A | 1/1916 | Barba |
| 1,167,472 A | 1/1916 | Barba |
| 1,183,445 A | 5/1916 | Foxwell |
| 1,788,466 A | 1/1931 | Lourens |
| 1,984,164 A | 12/1934 | Stock |
| 2,016,821 A | 10/1935 | Nelms |
| 2,059,388 A | 11/1936 | Nelms |
| 2,089,599 A | 8/1937 | Crecelius |
| 2,511,288 A | 6/1950 | Morrell et al. |
| 3,194,629 A | 7/1965 | Dreibelbis et al. |
| 3,288,576 A | 11/1966 | Pierron et al. |
| 3,437,476 A | 4/1969 | Dotson et al. |
| 3,599,610 A | 8/1971 | Spector |
| 3,662,523 A | 5/1972 | Revoir et al. |
| 3,725,530 A | 4/1973 | Kawase et al. |
| 3,764,496 A | 10/1973 | Hultman et al. |
| 3,823,676 A | 7/1974 | Cook et al. |
| 3,838,190 A | 9/1974 | Birke et al. |
| 3,849,267 A | 11/1974 | Hilgen et al. |
| 3,849,537 A | 11/1974 | Allgulin |
| 3,956,458 A | 5/1976 | Anderson |
| 3,961,020 A | 6/1976 | Seki |
| 3,974,254 A | 8/1976 | de la Cuadra Herrera et al. |
| 4,040,802 A | 8/1977 | Deitz et al. |
| 4,075,282 A | 2/1978 | Storp et al. |
| 4,094,777 A | 6/1978 | Sugier et al. |
| 4,101,631 A | 7/1978 | Ambrosini et al. |
| 4,115,518 A | 9/1978 | Delmon et al. |
| 4,148,613 A | 4/1979 | Myers |
| 4,174,373 A | 11/1979 | Yoshida et al. |
| 4,196,173 A | 4/1980 | deJong et al. |
| 4,226,601 A | 10/1980 | Smith |
| 4,233,274 A | 11/1980 | Allgulin |
| 4,272,250 A | 6/1981 | Burk, Jr. et al. |
| 4,280,817 A | 7/1981 | Chauhan et al. |
| 4,305,726 A | 12/1981 | Brown, Jr. |
| 4,322,218 A | 3/1982 | Nozaki |
| 4,377,599 A | 3/1983 | Willard, Sr. |
| 4,387,653 A | 6/1983 | Voss |
| 4,394,354 A | 7/1983 | Joyce |
| 4,440,100 A | 4/1984 | Michelfelder et al. |
| 4,472,278 A | 9/1984 | Suzuki |
| 4,474,896 A | 10/1984 | Chao |
| 4,519,807 A | 5/1985 | Nishino et al. |
| 4,519,995 A | 5/1985 | Schrofelbauer et al. |
| 4,555,392 A | 11/1985 | Steinberg |
| 4,582,936 A | 4/1986 | Ashina et al. |
| 4,600,438 A | 7/1986 | Harris |
| 4,602,918 A | 7/1986 | Steinberg et al. |
| 4,629,721 A | 12/1986 | Ueno |
| 4,693,731 A | 9/1987 | Tarakad et al. |
| 4,716,137 A | 12/1987 | Lewis |
| 4,741,278 A | 5/1988 | Franke et al. |
| 4,758,418 A | 7/1988 | Yoo et al. |
| 4,764,219 A | 8/1988 | Yan |
| 4,786,483 A | 11/1988 | Audeh |
| 4,804,521 A | 2/1989 | Rochelle et al. |
| 4,807,542 A | 2/1989 | Dykema |
| 4,824,441 A | 4/1989 | Kindig |
| 4,830,829 A | 5/1989 | Craig, Jr. |
| 4,873,930 A | 10/1989 | Egense et al. |
| 4,886,519 A | 12/1989 | Hayes et al. |
| 4,892,567 A | 1/1990 | Yan |
| 4,915,818 A | 4/1990 | Yan |
| 4,933,158 A | 6/1990 | Aritsuka et al. |
| 4,936,047 A | 6/1990 | Feldmann et al. |
| 4,964,889 A | 10/1990 | Chao |
| 5,013,358 A | 5/1991 | Ball et al. |
| 5,024,171 A | 6/1991 | Krigmont et al. |
| 5,049,163 A | 9/1991 | Huang et al. |
| 5,116,793 A | 5/1992 | Chao et al. |
| 5,122,353 A | 6/1992 | Valentine |
| 5,126,300 A | 6/1992 | Pinnavaia et al. |
| 5,137,854 A | 8/1992 | Segawa et al. |
| 5,162,598 A | 11/1992 | Hutchings et al. |
| 5,190,566 A | 3/1993 | Sparks et al. |
| 5,238,488 A | 8/1993 | Wilhelm |
| 5,350,728 A | 9/1994 | Cameron et al. |
| 5,368,617 A | 11/1994 | Kindig |
| 5,409,522 A | 4/1995 | Durham et al. |
| 5,435,980 A | 7/1995 | Felsvang et al. |
| 5,447,703 A | 9/1995 | Baer et al. |
| 5,460,643 A | 10/1995 | Hasenpusch et al. |
| 5,505,746 A | 4/1996 | Chriswell et al. |
| 5,505,766 A | 4/1996 | Chang |
| 5,571,490 A | 11/1996 | Bronicki et al. |
| 5,587,003 A | 12/1996 | Bulow et al. |
| 5,618,508 A | 4/1997 | Suchenwirth et al. |
| 5,635,150 A | 6/1997 | Coughlin |
| 5,659,100 A | 8/1997 | Lin |
| 5,670,122 A | 9/1997 | Zamansky et al. |
| 5,733,516 A | 3/1998 | DeBerry |
| 5,738,834 A | 4/1998 | Deberry |
| 5,787,823 A | 8/1998 | Knowles |
| 5,810,910 A | 9/1998 | Ludwig et al. |
| 5,897,688 A | 4/1999 | Voogt et al. |
| 5,910,292 A | 6/1999 | Alvarez, Jr. et al. |
| 5,989,506 A | 11/1999 | Markovs |
| 6,024,931 A | 2/2000 | Hanulik |
| 6,083,289 A * | 7/2000 | Ono ............... C21B 5/003 44/620 |
| 6,240,859 B1 | 6/2001 | Jones, Jr. |
| 6,258,334 B1 | 7/2001 | Gadkaree et al. |
| 6,372,187 B1 | 4/2002 | Madden et al. |
| 6,375,909 B1 | 4/2002 | Dangtran et al. |
| 6,475,451 B1 | 11/2002 | Leppin et al. |
| 6,521,021 B1 | 2/2003 | Pennline et al. |
| 6,528,030 B2 | 3/2003 | Madden et al. |
| 6,533,842 B1 | 3/2003 | Maes et al. |
| 6,558,454 B1 | 5/2003 | Chang et al. |
| 6,610,263 B2 | 8/2003 | Pahlman et al. |
| 6,613,110 B2 | 9/2003 | Sanyal |
| 6,719,828 B1 | 4/2004 | Lovell et al. |
| 6,732,055 B2 | 5/2004 | Bagepalli et al. |
| 6,737,031 B2 | 5/2004 | Beal et al. |
| 6,746,531 B1 | 6/2004 | Barbour |
| 6,790,420 B2 | 9/2004 | Breen et al. |
| 6,808,692 B2 | 10/2004 | Oehr |
| 6,848,374 B2 | 2/2005 | Srinivasachar et al. |
| 6,878,358 B2 | 4/2005 | Vosteen et al. |
| 6,942,840 B1 | 9/2005 | Broderick |
| 6,953,494 B2 | 10/2005 | Nelson, Jr. |
| 6,962,617 B2 | 11/2005 | Simpson |
| 6,974,564 B2 | 12/2005 | Biermann et al. |
| 6,975,975 B2 | 12/2005 | Fasca |
| 7,442,352 B2 | 10/2008 | Lu et al. |
| 7,507,083 B2 | 3/2009 | Comrie |
| 8,309,046 B2 * | 11/2012 | Pollack ............... B01D 53/02 423/210 |
| 8,313,323 B2 * | 11/2012 | Comrie ............... B01D 53/30 422/105 |
| 8,372,362 B2 * | 2/2013 | Durham ............... B01D 53/64 423/210 |
| 8,439,989 B2 | 5/2013 | Baldrey et al. |
| 8,574,324 B2 | 11/2013 | Comrie et al. |
| 2002/0065581 A1 | 5/2002 | Fasca |
| 2002/0068030 A1 | 6/2002 | Nolan et al. |
| 2002/0114749 A1 | 8/2002 | Cole |
| 2002/0184817 A1 | 12/2002 | Johnson et al. |
| 2003/0088370 A1 | 5/2003 | Bagepalli et al. |
| 2003/0103882 A1 | 6/2003 | Biermann et al. |
| 2004/0003716 A1 | 1/2004 | Nelson |
| 2004/0013589 A1 | 1/2004 | Vosteen et al. |
| 2004/0086439 A1 | 5/2004 | Vosteen et al. |
| 2004/0219083 A1 | 11/2004 | Schofield |
| 2005/0019240 A1 | 1/2005 | Lu et al. |
| 2005/0039598 A1 | 2/2005 | Srinivasachar et al. |
| 2005/0169824 A1 | 8/2005 | Downs et al. |
| 2006/0185226 A1 * | 8/2006 | McDonald ............... C10L 5/366 44/620 |
| 2006/0210463 A1 | 9/2006 | Comrie |
| 2007/0180990 A1 | 8/2007 | Downs et al. |
| 2008/0107579 A1 | 5/2008 | Downs et al. |
| 2008/0121142 A1 | 5/2008 | Comrie et al. |

(56) References Cited

U.S. PATENT DOCUMENTS

| | | | |
|---|---|---|---|
| 2011/0030592 A1 | 2/2011 | Baldrey et al. | |
| 2012/0020856 A1 | 1/2012 | Pollack | |
| 2012/0167762 A1* | 7/2012 | Brasseur | B01D 53/64 95/134 |
| 2013/0039826 A1 | 2/2013 | Pollack et al. | |
| 2013/0202504 A1 | 8/2013 | Pollack | |
| 2014/0299028 A1 | 10/2014 | Kotch et al. | |
| 2016/0339385 A1* | 11/2016 | Mimna | B01D 53/64 |

FOREIGN PATENT DOCUMENTS

| | | |
|---|---|---|
| CN | 1354230 A | 6/2002 |
| CN | 1382657 A | 12/2002 |
| CN | 1421515 A | 6/2003 |
| CN | 1473914 A | 2/2004 |
| DE | 25 48 845 A1 | 5/1976 |
| DE | 19745191 A1 | 4/1999 |
| DE | 10209448 A1 | 9/2003 |
| EP | 0433677 A1 | 6/1991 |
| JP | 10-5537 | 1/1998 |
| JP | 2000-325747 A | 11/2000 |
| WO | 2006/006978 A1 | 1/2006 |
| WO | 2006037213 A1 | 4/2006 |

OTHER PUBLICATIONS

XP-002601722 (English Abstract to CN177628) from Supplementary Partial European Search Report dated Oct. 19, 2010 (mailed Oct. 29, 2010).

XP-002601723 (English Abstract to CN1473914) from Supplementary Partial European Search Report dated Oct. 19, 2010 (mailed Oct. 29, 2010).

Office Action dated May 25, 2010 in counterpart Chinese Application No. 2006/80016960.0.

Office Action dated Oct. 23, 2009 in counterpart Chinese Application No. 2005/80028759.X.

McCoy et al., Full-Scale Mercury Sorbent Injection Testing at DTE Energy's St. Clair Station, Paper #97, DTE Energy, Aug. 30-Sep. 2, 2004.

Sudhoff Presentation: "Anticipated Benefits of the TOXECON Retrofit for Mercury and Multi-Pollutant Control Technology", National Energy Technology Laboratory, pp. 19, Nov. 19, 2003.

TECHNews From the National Energy Technology Laboratory, "DOE Announces Further Field Testing of Advanced Mercury Control Technologies, Six Projects Selected in Round 2 to Address Future Power Plant Mercury Reduction Initiatives", pp. 3, Nov. 5, 2004.

Turner, Jackie; News Release: Texas Genco, EPRI, and URS Corporation Test Innovative Mercury Control Method at Limestone Station, "Technology Aims to Capture More Mercury from Power Plant Exhaust",www.epri.com/corporate/discover.sub.--epri/news/ 2005/011105.sub.--mercury- .html, pp. 2, Jan. 11, 2005, printed Jan. 20, 2005.

Vosteen et al., "Bromine Enhanced Mercury Abatement Recent Industrial Applications and Laboratory Research", Vosteen Consulting GmbH, Thermal Engineering and Flue Gas Cleaning, pp. 25, May 24 & 25, 2005.

www.entsorgung.bayer.com/index.cfm?PAGE.sub.--ID=209, Focus on your success, "Incineration: Taking the heat out of complex waste", pp. 2, Jun. 2, 2005.

www.entsorgung.bayer.com/index.cfmPAGE-ID=301, Focus on your success, "Incineration", pp. 2, Jun. 2, 2005.

Office action dated Aug. 24, 2010 in counterpart Chinese Application No. 2005/80049750.7.

Office action dated Dec. 28, 2010 in counterpart Russian Application No. 2007138433.

Office action dated Nov. 12, 2010 in counterpart Chinese Application No. 2007/80004642.7.

* cited by examiner

SORBENTS FOR COAL COMBUSTION

CROSS-REFERENCE TO RELATED APPLICATIONS

This application is a continuation of co-pending U.S. Ser. No. 14/254,379 filed on Apr. 16, 2014; which is a continuation of U.S. Ser. No. 14/036,036 filed on Sep. 25, 2013 (now U.S. Pat. No. 8,703,081, with issue date Apr. 22, 2014); which is a continuation of U.S. Ser. No. 13/679,775 filed on Nov. 16, 2012 (now U.S. Pat. No. 8,545,778, with issue date Oct. 1, 2013); which is a continuation of U.S. Ser. No. 13/343,491 filed on Jan. 4, 2012 (now U.S. Pat. No. 8,313,323, with issue date Nov. 20, 2012); which is a continuation of U.S. Ser. No. 13/169,187 filed on Jun. 27, 2011 (now U.S. Pat. No. 8,114,368. with issue date Feb. 14, 2012); which is a continuation of U.S. Ser. No. 12/839,154 filed on Jul. 19, 2010 (now U.S. Pat. No. 7,988,939, with issue date Aug. 2, 2011); which is a continuation of U.S. Ser. No. 12/705,196 filed on Feb. 12, 2010 (now U.S. Pat. No. 7,776,301, with issue date Aug. 17, 2010); which is a continuation of U.S. Ser. No. 12/351,191 filed on Jan. 9, 2009 (now U.S. Pat. No. 7,674,442, with issue date Mar. 9, 2010); which is a continuation of U.S. Ser. No. 11/377,528 filed on Mar. 16, 2006 (now U.S. Pat. No. 7,507,083, with issue date Mar. 24, 2009); which claims the benefit of U.S. Provisional Application 60/662,911 filed on Mar. 17, 2005, the full disclosures of which are hereby incorporated by reference.

INTRODUCTION

The invention provides compositions and methods for reducing the levels of mercury emitted into the atmosphere upon burning of mercury containing fuels such as coal. In particular, the invention provides for addition of various halogen and other sorbent compositions into the coal burning system during combustion.

Significant coal resources exist around the world that are capable of meeting large portions of the world's energy needs into the next two centuries. High sulfur coal is plentiful, but requires remediation steps to prevent excess sulfur from being released into the atmosphere upon combustion. In the United States, low sulfur coal exists in the form of low BTU value coal in the Powder River basin of Wyoming and Montana, in lignite deposits in the North Central region of North and South Dakota, and in lignite deposits in Texas. But even when coals contain low sulfur, they still contain non-negligible levels of elemental and oxidized mercury.

Unfortunately, mercury is at least partially volatilized upon combustion of coal. As a result, the mercury tends not to stay with the ash, but rather becomes a component of the flue gases. If remediation is not undertaken, the mercury tends to escape from the coal burning facility, leading to environmental problems. Some mercury today is captured by utilities, for example in wet scrubber and SCR control systems. However, most mercury is not captured and is therefore released through the exhaust stack.

In the United States, the Clean Air Act Amendments of 1990 contemplated the regulation and control of mercury. A mercury study in the report to Congress in 1997 by the Environmental Protection Agency (EPA) further defined the bounds of mercury release from power plants in the United States. In December 2000, the EPA decided to regulate mercury, and have published proposed clean air mercury rules in January and March of 2004. A set of regulations for required mercury reduction from US coal burning plants has now been promulgated by the United States Environmental Protection Agency.

In addition to wet scrubber and SCR control systems that tend to remove mercury partially from the flue gases of coal combustion, other methods of control have included the use of activated carbon systems. Use of such systems tends to be associated with high treatment costs and elevated capital costs. Further, the use of activated carbon systems leads to carbon contamination of the fly ash collected in exhaust air treatments such as the bag house and electrostatic precipitators.

Mercury emissions into the atmosphere in the United States are approximately 50 tons per year. A significant fraction of the release comes from emissions from coal burning facilities such as electric utilities. Mercury is a known environmental hazard and leads to health problems for both humans and non-human animal species. To safeguard the health of the public and to protect the environment, the utility industry is continuing to develop, test, and implement systems to reduce the level of mercury emissions from its plants. In combustion of carbonaceous materials, it is desirable to have a process wherein mercury and other undesirable compounds are captured and retained after the combustion phase so that they are not released into the atmosphere.

SUMMARY

Processes and compositions are provided for decreasing emissions of mercury upon combustion of fuels such as coal. Various sorbent compositions are provided that contain components that reduce the level of mercury and/or sulfur emitted into the atmosphere upon burning of coal. In various embodiments, the sorbent compositions are added directly to the fuel before combustion; are added partially to the fuel before combustion and partially into the flue gas post combustion zone; or are added completely into the flue gas post combustion zone. In preferred embodiments, the sorbent compositions comprise a source of halogen and preferably a source of calcium. Among the halogens, iodine and bromine are preferred. In various embodiments, inorganic bromides make up a part of the sorbent compositions.

In various embodiments, mercury sorbent compositions containing bromine or iodine are added to the fuel as a powder or a liquid prior to combustion. Alternatively, the sorbent compositions containing halogen, such as bromine and iodine, are injected into the flue gas at a point after the combustion chamber where the temperature is higher than about 1500° F. (about 800° C.).

In preferred embodiments, the sorbent compositions further contain other components, especially a source of calcium. Thus, in one embodiment, the invention provides for singular and multiple applications of multi-element oxidizers, promoters, and sorbents to coal prior to and/or after combustion in a furnace. In various embodiments, the components of the sorbent compositions develop ceramic characteristics upon combustion and subsequent calcination of the components with the carbonaceous materials. In various embodiments, use of the sorbent compositions reduces mercury emissions by capturing and stabilizing oxidized and elemental mercury with multiple-element remediation materials such as calcium oxides, calcium bromides, other calcium halogens, as well as oxides of silicon, aluminum, iron, magnesium, sodium, and potassium.

In preferred embodiments, mercury emissions from coal burning facilities are reduced to such an extent that 90% or more of the mercury in the coal is captured before release into the atmosphere. The mercury remediation processes can be used together with sorbent compositions and other processes that remove sulfur from the combustion gas steam. Thus in preferred embodiments, significant sulfur reduction is achieved along with 90% plus reduction of mercury emissions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DESCRIPTION

The following description of the preferred embodiment(s) is merely exemplary in nature and is in no way intended to limit the invention, its application, or uses.

In various embodiments, the invention provides compositions and methods for reducing emissions of mercury that arise from the combustion of mercury containing fuels such as coal. Systems and facilities that burn fuels containing mercury will be described with particular attention to the example of a coal burning facility such as used by electrical utilities. Such facilities generally have some kind of feeding mechanism to deliver the coal into a furnace where the coal is burned or combusted. The feeding mechanism can be any device or apparatus suitable for use. Non-limiting examples include conveyer systems, screw extrusion systems, and the like. In operation, a mercury-containing fuel such as coal is fed into the furnace at a rate suitable to achieve the output desired from the furnace. Generally, the output from the furnace is used to boil water for steam to provide direct heat, or else the steam is used to turn turbines that eventually result in the production of electricity.

The coal is fed into the furnace and burned in the presence of oxygen. Typical flame temperatures in the combustion temperature are on the order of 2700° F. to about 3000° F. After the furnace or boiler where the fed fuel is combusted, the facility provides convective pathways for the combustion gases, which for convenience are sometimes referred to as flue gases. Hot combustion gases and air move by convection away from the flame through the convective pathway in a downstream direction (i.e., downstream in relation to the fireball). The convection pathway of the facility contains a number of zones characterized by the temperature of the gases and combustion products in each zone. Generally, the temperature of the combustion gas falls as it moves in a direction downstream from the fireball. The combustion gases contain carbon dioxide as well as various undesirable gases containing sulfur and mercury. The convective pathways are also filled with a variety of ash which is swept along with the high temperature gases. To remove the ash before emission into the atmosphere, particulate removal systems are used. A variety of such removal systems can be disposed in the convective pathway such as electrostatic precipitators and a bag house. In addition, chemical scrubbers can be positioned in the convective pathway. Additionally, there may be provided various instruments to monitor components of the gas such as sulfur and mercury.

From the furnace, where the coal is burning at a temperature of approximately 2700° F.-3000° F., the fly ash and combustion gases move downstream in the convective pathway to zones of ever decreasing temperature. Immediately downstream of the fireball is a zone with temperature less that 2700° F. Further downstream, a point is reached where the temperature has cooled to about 1500° F. Between the two points is a zone having a temperature from about 1500 to about 2700° F. Further downstream, a zone of less than 1500° F. is reached, and so on. Further along in the convective pathway, the gases and fly ash pass through lower temperature zones until the baghouse or electrostatic precipitator is reached, which typically has a temperature of about 300° F. before the gases are emitted up the stack.

In various embodiments, the process of the present invention calls for the application of a mercury sorbent directly to a fuel such as coal before combustion (addition "pre-combustion");

directly into the gaseous stream after combustion in a temperature zone of between 2700° F. and 1500° F. (addition "post-combustion"); or in a combination of pre-combustion and post-combustion additions.

In various embodiments, oxidized mercury from combustion reports to the bag house or electrostatic precipitator and becomes part of the overall ash content of the coal burning plant. Heavy metals in the ash do not leach below regulatory levels.

In various embodiments, mercury emissions from the coal burning facility are monitored. Depending on the level of mercury in the flue gas prior to emission from the plant, the amount of sorbent composition added onto the fuel per- and/or post-combustion is raised, lowered, or is maintained unchanged. In general, it is desirable to remove as high a level of mercury as is possible. In typical embodiments, mercury removal of 90% and greater are achieved, based on the total amount of mercury in the coal. This number refers to the mercury removed from the flue gases so that mercury is not released through the stack into the atmosphere. To minimize the amount of sorbent added into the coal burning process so as to reduce the overall amount of ash produced in the furnace, it is desirable in many environments to use the measurements of mercury emissions to reduce the sorbent composition rate of addition to one which will achieve the desired mercury reduction without adding excess material into the system.

Thus in one embodiment, a method is provided for burning coal to reduce the amount of mercury released into the atmosphere. The method involves first applying a sorbent composition comprising a halogen compound onto the coal. The coal is then delivered into the furnace of a coal burning plant. The coal containing the sorbent composition is then combusted in the furnace to produce ash and combustion gases. The combustion gases contain mercury, sulfur and other components. To accomplish a desired reduction of mercury in the combustion gases in order to limit release into the atmosphere, the mercury level in the combustion gases is preferably monitored by measuring the level analytically. In preferred embodiments, the amount of the sorbent composition applied onto the coal before composition is adjusted depending on the value of the mercury level measured in the combustion gases.

In another embodiment, a mercury sorbent is added into the coal burning system after combustion in a region having a temperature from about 1500° F. to 2700° F. (about 815° C. to 1482° C.). A method is provided for reducing the level of mercury released into the atmosphere upon combustion of coal that contains mercury. The combustion is carried out in a coal burning system containing a furnace and a convective pathway for the combustion gases. The method involves burning the coal in the furnace and injecting a sorbent containing a halogen into the convective pathway at a point where the combustion gases are at a temperature of 1500° F. to 2700° F. If desired, the level of mercury in the gases escaping the facility is monitored and measured. Depending on the level of mercury escaping from the facility, reflected in the value determined by monitoring, the rate of addition of the mercury sorbent can be increased, decreased, or maintained unchanged. In a further embodiment, a mercury sorbent containing a halogen can be both applied to the coal prior to combustion and injected into the convective pathway at a point where the combustion gases are at a temperature of 1500° F. to 2700° F.

Sorbent composition comprising a halogen compound contains one or more organic or inorganic compounds containing a halogen. Halogens include chlorine, bromine, and iodine. Preferred halogens are bromine and iodine. The halogen compounds noted above are sources of the halogens, especially of bromine and iodine. For bromine, sources of the halogen include various inorganic salts of bromine including bromides, bromates, and hypobromites. In various embodiments, organic bromine compounds are less preferred because of their cost or availability. However, organic sources of bromine containing a suitably high level of bromine are considered within the scope of the invention. Non-limiting examples of organic bromine compounds include methylene bromide, ethyl bromide, bromoform, and carbonate tetrabromide. Non-limiting sources of iodine include hypoiodites, iodates, and iodides, with iodides being preferred.

When the halogen compound is an inorganic substituent, it is preferably a bromine or iodine containing salt of an alkali metal or an alkaline earth element. Preferred alkali metals include lithium, sodium, and potassium, while preferred alkaline earth elements include beryllium, magnesium, and calcium. Of halogen compounds, particularly preferred are bromides and iodides of alkaline earth metals such as calcium.

The sorbent composition containing the halogen is provided in the form of a liquid or of a solid composition. When it is a liquid composition, the sorbent composition comprises preferably an aqueous solution of a bromine or iodine compound as described above. The methods of the invention that reduce the level of mercury released into the atmosphere upon combustion of coal involve applying the sorbent composition, in the form of either a liquid or a solid composition, into the coal burning process. In one embodiment, the sorbent composition is added to the coal prior to combustion, while in another the sorbent composition is injected into the convective pathway of the coal burning facility in a zone having a temperature of 1500° F. to 2700° F. In various embodiments, sorbent addition can take place both pre-combustion and post-combustion. In a preferred embodiment, an aqueous sorbent containing a halogen is sprayed onto the coal pre-combustion and the coal enters the furnace still wet with water.

In various embodiments, liquid mercury sorbent comprises a solution containing 5-60% by weight of a soluble bromine or iodine containing salt. Non-limiting examples of preferred bromine and iodine salts include calcium bromide and calcium iodide. In various embodiments, liquid sorbents contain 5-60% by weight of calcium bromide and/or calcium iodide. For efficiency of addition to the coal prior to combustion, in various embodiments it is preferred to add mercury sorbents having as high level of bromine or iodine compound as is feasible. In a non-limiting embodiment, the liquid sorbent contains 50% or more by weight of the halogen compound, such as calcium bromide or calcium iodide.

In various embodiments, the sorbent compositions containing a halogen compound further contain a nitrate compound, a nitrite compound, or a combination of nitrate and nitrite compounds. Preferred nitrate and nitrite compounds include those of magnesium and calcium, preferably calcium. Thus, in a preferred embodiment, the mercury sorbent composition contains calcium bromide. Calcium bromide can be formulated with other components such as the nitrates and nitrites discussed above and to either a powder sorbent composition or a liquid sorbent composition. The powder or liquid sorbent compositions containing halogen are added on to the coal pre-combustion, injected into the convective pathways of the coal burning facility in a zone having a temperature of about 1500° F. to about 2700° F., or a combination of the two.

The mercury sorbent compositions containing a halogen compound preferably further comprise a source of calcium. Non-limiting examples of calcium sources include calcium oxides, calcium hydroxides, calcium carbonate, calcium bicarbonate, calcium sulfate, calcium bisulfate, calcium nitrate, calcium nitrite, calcium acetate, calcium citrate, calcium phosphate, calcium hydrogen phosphate, and calcium minerals such as apatite and the like. Preferred sources of calcium include calcium halides, such as calcium bromide, calcium chloride, and calcium iodide. Organic calcium compounds can also be used. Non-limiting examples include calcium salts of carboxylic acids, calcium alkoxylates, and organocalcium compounds. As with the halogen compounds above, in various embodiments, the organic calcium compounds tend to be less preferred because of expense and availability.

In addition to the mercury sorbent composition added into the system before or after combustion, a sulfur sorbent composition may be added along with the mercury sorbent. Thus, in preferred embodiments, methods are provided for reducing both sulfur and mercury emissions in the flue gas upon combustion of coal containing sulfur and mercury. In a preferred embodiment, a method involves applying a first sorbent composition and a second sorbent composition into the system. One of the first and second sorbent compositions is added to the coal prior to combustion and the other is injected into the coal burning system in a zone of the convective pathway downstream of the burning chamber, preferably where the temperature is in the range of between 1500° F. to 2700° F. The first sorbent composition preferably contains a halogen component and is added at level effective to reduce mercury in the combustion gases. The second sorbent composition contains at least a calcium component and is added at level effective to reduce sulfur in the combustion gases.

In the embodiments of the previous paragraph, the first sorbent composition containing the halogen component comprises a halogen compound such as the preferred bromine and iodine compounds described above. The second sorbent composition contains calcium in a form suitable for the reduction of sulfur emissions from the burning coal system. The second sorbent composition containing a calcium component preferably contains calcium in a minimum molar amount of 1:1 based on the molar amount of sulfur present in the coal. Preferably, the level of calcium added to the system with the second sorbent composition is no greater than 3:1 with respect to moles of sulfur in the coal. Treatment at higher levels of calcium tends to waste material and risks blinding off the furnace, thereby impeding the combustion process and loading the particulate control system.

Essentially, it is desired to add the calcium-containing sulfur sorbent at a level effective to remove sulfur from the flue gases of the burning coal, but not in an over abundant amount that would lead to production of excess ash. The second sorbent composition containing a calcium component can contain any of the inorganic or organic calcium compounds noted above. In addition, various industrial products contain calcium at a suitable level, such as cement kiln dust, lime kiln dust, Portland cement, and the like. In various embodiments, the calcium-containing sulfur sorbent contains a calcium powder such as those listed, along with an aluminosilicate clay such as montmorillonite or kaolin. The calcium containing sulfur sorbent composition preferably contains sufficient $SiO_2$ and $Al_2O_3$ to form a refractory-like mixture with calcium sulfate produced by combustion, such that the calcium sulfate is handled by the particle control system of the furnace. In preferred embodiments, the calcium containing sulfur absorbent contains a minimum of 2% silica and 2% alumina.

In a preferred embodiment, a mercury sorbent composition containing calcium and bromine is applied to the coal. In various embodiments, the sorbent composition contains calcium bromide. Alternatively, the absorbent composition contains a bromine compound other than calcium bromide and a calcium compound other than calcium bromide. Non-limiting examples of sources of calcium include calcium bromide, calcium nitrite, Portland cement, calcium oxide, calcium hydroxide and calcium carbonate. Then the coal containing the calcium and bromine sorbent composition is burned to produce ash and combustion gases. Desirably, the level of mercury in the combustion gases is measured and monitored. The level of bromine added to the coal by way of the sorbent composition is then adjusted up or down or left unchanged, depending on the level of mercury measured in the combustion gases. In various embodiments, the method further provides for measuring a level of sulfur in the combustion gases and adjusting the level of calcium added onto the coal based on the level of sulfur measured. In preferred embodiments, mercury emissions into the environment from the coal burning facility are reduced by 90% or more. As used in this application, a mercury reduction of 90% or more means at least 90% of the mercury in the coal being burned is captured to prevent its release into the atmosphere. Preferably, a sufficient amount of bromine is added onto the coal prior to combustion to reduce the mercury emissions into the environment by 90% or more.

In one aspect, the invention involves reducing the level of mercury emitted into the atmosphere from facilities that burn fuels containing mercury. A commercially valuable embodiment is use of the invention to reduce mercury emissions from coal burning facilities to protect the environment and comply with government regulations and treaty obligations. Much of the following discussion will refer to coal as the fuel; it is to be understood that the description of coal burning is for illustrative purposes only and the invention is not necessarily to be limited thereby.

In various embodiments, the methods of the invention involve adding a mercury sorbent into the fuel or coal burning system at treatment levels sufficient to cause a desired lowering of the levels of mercury escaping from the facility into the atmosphere upon combustion of the fuel. Suitable mercury sorbents are described above. In a preferred embodiment, the mercury sorbents contain a source of bromine and/or iodine, preferably in the form of inorganic bromide or iodide salts as discussed above.

In one embodiment, the mercury sorbent composition is added onto coal prior to its combustion. The coal is particulate coal, and is optionally pulverized or powdered according to conventional procedures. The sorbent composition is added onto the coal as a liquid or as a solid. Generally, solid sorbent compositions are in the form of a powder. If the sorbent is added as a liquid (usually as a solution of one or more bromine or iodine salts in water), in one embodiment the coal remains wet when fed into the burner. The sorbent composition can be added onto the coal continuously at the coal burning facility by spraying or mixing onto the coal while it is on a conveyor, screw extruder, or other feeding apparatus. In addition or alternatively, the sorbent composition may be separately mixed with the coal at the coal burning facility or at the coal producer. In a preferred embodiment, the sorbent composition is added as a liquid or a powder to the coal as it is being fed into the burner. For example, in a preferred commercial embodiment, the sorbent is applied into the pulverizers that pulverize the coal prior to injection. If desired, the rate of addition of the sorbent composition can be varied to achieve a desired level of mercury emissions. In one embodiment, the level of mercury in the flue gases is monitored and the level of sorbent addition adjusted up or down as required to maintain the desired mercury level.

Mercury levels can be monitored with conventional analytical equipment using industry standard detection and determination methods. In one embodiment, monitoring is conducted periodically, either manually or automatically. In a non-limiting example, mercury emissions are monitored once an hour to ensure compliance with government regulations. To illustrate, the Ontario Hydro method is used. In this known method, gases are collected for a pre-determined time, for example one hour. Mercury is precipitated from the collected gases, and the level is quantitated using a suitable method such as atomic absorption. Monitoring can also take more or less frequently than once an hour, depending on technical and commercial feasibility. Commercial continuous mercury monitors can be set to measure mercury and produce a number at a suitable frequency, for example once every 3-7 minutes. In various embodiments, the output of the mercury monitors is used to control the rate of addition of mercury sorbent. Depending on the results of monitoring, the rate of addition of the mercury sorbent is adjusted by either increasing the level of addition; decreasing it, or leaving it unchanged. To illustrate, if monitoring indicates mercury levels are higher than desired, the rate of addition of sorbent is increased until mercury levels return to a desired level. If mercury levels are at desired levels, the rate of sorbent addition can remain unchanged. Alternatively, the rate of sorbent addition can be lowered until monitoring indicates it should be increased to avoid high mercury levels. In this way, mercury emission reduction is achieved and excessive use of sorbent (with concomitant increase of ash) is avoided.

Mercury is monitored in the convective pathway at suitable locations. In various embodiments, mercury released into the atmosphere is monitored and measured on the clean side of the particulate control system. Mercury can also be monitored at a point in the convective pathway upstream of the particulate control system. Experiments show that as much as 20 to 30% of the mercury in coal is captured in the ash and not released into the atmosphere when no mercury sorbent is added. Addition of mercury sorbents according to the invention raises the amount of mercury capture (and thus reduces the amount of mercury emissions) to 90% or more.

Alternatively or in addition, a mercury sorbent composition is inserted or injected into the convective pathway of the coal burning facility to reduce the mercury levels. Preferably, the sorbent composition is added into a zone of the convective pathway downstream of the fireball (caused by combustion of the coal), which zone has a temperature above about 1500° F. and less than the fireball temperature of 2700-3000° F. In various embodiments, the temperature of sorbent is above about 1700° F. The zone preferably has a temperature below about 2700° F. In various embodiments, the injection zone has a temperature below 2600° F., below about 2500° F. or below about 2400° F. In non-limiting examples, the injection temperature is from 1700° F. to 2300° F., from 1700° F. to 2200° F., or from about 1500° F. to about 2200° F. As with pre-combustion addition, the sorbent can be in the form of a liquid or a solid (powder), and contains an effective level of a bromine or iodine compound. In various embodiments, the rate of addition of sorbent into the convective pathway is varied depending on the results of mercury monitoring as described above with respect to pre-combustion addition of sorbent.

In preferred embodiments, sorbent composition is added more or less continuously to the coal before combustion and/or to the convective pathway in the 1500° F.-2700° F. zone as described above. In various embodiments, automatic feedback loops are provided between the mercury monitoring apparatus and the sorbent feed apparatus. This allows for a constant monitoring of emitted mercury and adjustment of sorbent addition rates to control the process.

Along with the mercury sorbent, a sulfur sorbent is preferably added to control the release of sulfur into the environment. In various embodiments, the sulfur sorbent is added into the coal burning system at the same places the mercury sorbent is added. The sulfur sorbent can also be added at other places, depending on technical feasibility. In various embodiments, the components of the mercury sorbent and sulfur are combined into a single sorbent added to the coal or injected into the convective pathway. The sorbents, either separately or combined, are added in the form of a liquid or a solid. Solid compositions are usually in the form of a powder.

The sulfur sorbent preferably contains calcium at a level at least equal, on a molar basis, to the sulfur level present in the coal being burned. As a rule of thumb, the calcium level should be no more than about three times, on a molar basis, the level of sulfur. The 1:1 Ca:S level is preferred for efficient sulfur removal, and the upper 3:1 ratio is preferred to avoid production of excess ash from the combustion process. Treatment levels outside the preferred ranges are also part of the invention. Suitable sulfur sorbents are described, for example, in co-owned provisional application 60/583,420, filed Jun. 28, 2004, the disclosure of which is incorporated by reference.

Preferred sulfur sorbents include basic powders that contain calcium salts such as calcium oxide, hydroxide, and carbonate. Other basic powders containing calcium include portland cement, cement kiln dust, and lime kiln dust. In various embodiments, the sulfur sorbent also contains an aluminosilicate clay, montmorillonite, and/or kaolin. Preferably the sulfur sorbent contains suitable levels of silica and alumina (in a preferred embodiment, at least about 2% by weight of each) to form refractory materials with calcium sulfate formed by combustion of sulfur-containing coal. Silica and alumina can be added separately or as components of other materials such as Portland cement. In various embodiments, the sulfur sorbent also contains a suitable level of magnesium as MgO, contributed for example by dolomite or as a component of portland cement. In a non-limiting example, the sulfur sorbent contains 60-71% CaO, 12-15% $SiO_2$, 4-18% $Al_2O_3$, 1-4% $Fe_2O_3$, 0.5-1.5% MgO, and 0.1-0.5% $Na_2O$.

The mercury and sulfur sorbents can be added together or separately. For convenience, the components of the mercury and sulfur sorbents can be combined before addition onto the coal or injection into the convective pathways. In a preferred embodiment, the mercury sorbent contains calcium in addition to a source of halogen. In various embodiments, the mercury sorbent composition further comprises components that also reduce sulfur. The invention provides for addition of various sorbent compositions into the coal burning system to reduce emissions of mercury and, preferably, also of sulfur.

In various embodiments, sulfur and mercury sorbents are added separately. For example, a mercury sorbent is added to the coal pre-combustion and a sulfur sorbent is added post-combustion. Alternatively, a mercury sorbent is added post-combustion, while a sulfur sorbent is added pre-combustion. No matter the mode of addition, in a preferred embodiment the rate of addition of the various sorbents is adjusted as required on the basis of values of emitted sulfur and mercury determined by monitoring.

Mercury and sulfur sorbents are added at levels required to achieve the desired amount of reduced emissions. Preferred mercury reduction is 70% or more, preferably 80% or more and more preferable 90% or more, based on the total mercury in the coal being burned. On a weight basis, the mercury sorbent is generally added at a level of about 0.01 to 10% based on the weight of the coal. Preferred ranges include 0.05 to 5% and 0.1 to 1% by weight. The treat level varies depending on the content of halogen in the sorbent and the desired level of mercury emissions to be achieved. A level of 0.3% is suitable for many embodiments. In various embodiments, the initial treat level is adjusted up or down as required to achieve a desired emission level, based on monitoring as discussed above. The sorbent can be added in batch or continuously. In embodiments with continuous addition of sorbent, the treat levels are based on the feed rate of the coal being burned. Where the sorbent is added in batch, such as at the coal producer or at a separate mixing facility, the treat level is based on the weight of the coal being treated. In a preferred embodiment, the rate of addition or the treat level is adjusted based on a determination of emitted levels of mercury.

Likewise, sulfur sorbent is added at a level or rate satisfactory for reducing the level of emitted sulfur to an acceptable or desired level. In various embodiments, about 1 to 9% by weight of sulfur sorbent is added. The level or rate can be adjusted if desired based on the level of emitted sulfur determined by monitoring.

In preferred embodiments, mercury and sulfur are monitored using industry standard methods such as those published by the American Society for Testing and Materials (ASTM) or international standards published by the International Standards Organization (ISO). An apparatus comprising an analytical instrument is preferably disposed in the convective pathway downstream of the addition points of the mercury and sulfur sorbents. In a preferred embodiment, a mercury monitor is disposed on the clean side of the particulate control system. In various embodiments, a measured level of mercury or sulfur is used to provide feedback signals to pumps, solenoids, sprayers, and other devices that are actuated or controlled to adjust the rate of addition of a sorbent composition into the coal burning system. Alternatively or in addition, the rate of sorbent addition can be adjusted by a human operator based on the observed levels of mercury and/or sulfur.

To further illustrate, one embodiment of the present invention involves the addition of liquid mercury sorbent containing calcium bromide and water directly to raw or crushed coal prior to combustion. Addition of liquid mercury sorbent containing calcium bromide ranges from 0.1 to 5%, preferably from 0.025 to 2.5% on a wet basis, calculated assuming the calcium bromide is about 50% by weight of the sorbent. In a typical embodiment, approximately 1% of liquid sorbent containing 50% calcium bromide is added onto the coal prior to combustion.

In another embodiment, the invention involves the addition of calcium bromide solution both directly to the fuel and also in a zone of the furnace characterized by a temperature in the range of 2200° F. to 1500° F. In this embodiment, liquid mercury sorbent is added both before combustion and after combustion. Preferred treat levels of calcium bromide can be divided between the pre-combustion and post-combustion addition in any proportion.

In another embodiment, the invention provides for an addition of a calcium bromide solution such as discussed above, solely into the gaseous stream in a zone of the furnace characterized by a temperature in the range of 2200° F. to 1500° F.

The invention has been described above with respect to various preferred embodiments. Further non-limiting disclosure of the invention is provided in the Examples that follow. They illustrate the effectiveness of the invention when a liquid only and a liquid/solid sorbent system is applied for mercury remediation of fuels.

EXAMPLES

In the Examples, coals of varying BTU value, sulfur, and mercury content are burned in the CTF furnace at the Energy Environmental Research Center (EERC) at the University of North Dakota. Percent mercury and sulfur reductions are reported based on the total amount of the element in the coal prior to combustion.

Example 1

This example illustrates the mercury sorption ability of a calcium bromide/water solution when applied to a Powder River basin sub-bituminous coal. The as-fired coal has a moisture content of 2.408%, ash content of 4.83%, sulfur content of 0.29%, a heating value of 8,999 BTU and a mercury content of 0.122 µg/g. Combustion without sorbent results in a mercury concentration of 13.9 µg/m$^3$ in the exhaust gas. The fuel is ground to 70% passing 200 mesh and blended with 6% of a sorbent powder and 0.5% of a sorbent liquid, based on the weight of the coal. The powder contains by weight 40-45% Portland cement, 40-45% calcium oxide, and the remainder calcium or sodium montmorillonite. The liquid is a 50% by weight solution of calcium bromide in water.

The sorbents are mixed directly with the fuel for three minutes and then stored for combustion. The treated coal is fed to the furnace. Combustion results in a 90% mercury (total) removal at the bag house outlet and a 80% removal of sulfur as measured at the bag house outlet.

Example 2

This example illustrates the use of powder and liquid sorbents applied to three bituminous coals of varying mercury content. All coals are prepared as in Example #1, with the same addition levels of sorbents.

| Parameter | | Coal | % of Mercury Removal | % Sulfur Removal |
|---|---|---|---|---|
| % Moisture | 8.48 | Pittsburgh, | 97.97 | 40.0 |
| % Sulfur | 2.28 | Seam, Bailey | | |
| Mercury | 16.2 µg/m$^3$ | Coal | | |
| BTU value | 13,324 | | | |
| % Moisture | 10.46 | Freeman | 97.9 | 36.0 |
| % Sulfur | 4.24 | Crown III | | |
| Mercury | 8.53 µg/m$^3$ | | | |
| BTU value | 11,824 | | | |
| % Moisture | 1.0 | Kentucky | 90.1 | 52.0 |
| % Sulfur | 1.25 | Blend | | |
| Mercury | 5.26 µg/m$^3$ | | | |
| BTU value | 12,937 | | | |

Example 3

This example illustrates addition of a mercury sorbent post-combustion. Pittsburgh Seam-Bailey Coal is ground to 70% passing 200 mesh. No sorbent was added to the fuel pre-combustion. Liquid sorbent containing 50% calcium bromide in water is duct injected into the gaseous stream of the furnace in the 2200° F.-1500° F. zone. The liquid sorbent is injected at the rate of approximately 1.5% by weight of the coal.

| Coal Type | Sorbent Composition | % S reduction | # Hg Reduction |
|---|---|---|---|
| Pittsburgh Seam-Bailey Coal | 50% CaBr$_2$ 50% H20 | 28.13 | 96.0 |

Example 4

This example illustrates addition of a liquid and a powder sorbent post-combustion. No sorbent was added directly to the fuel. Both fuels are bituminous and noted as Freeman Crown III and Pittsburgh Seam-Bailey Coal. In both cases the coal was ground to 70% minus 200 mesh prior to combustion. The powder and liquid sorbents are as used in Example 1. Rates of liquid and powder addition (percentages based on the weight of the coal being burned), as well as mercury and sulfur reduction levels, are presented in the table.

| Coal Type | Liquid sorbent injection rate | Powder sorbent injection rate | S Reduction | Hg Reduction |
|---|---|---|---|---|
| Freeman Crown III | 1.0 | 4.0 | 36.27 | 97.89 |
| Pittsburgh Seam-Bailey Coal | 1.5 | 6.10 | 33.90 | 96.00 |

Example 5

Pittsburgh Seam Bailey Coal is prepared as in Example 1. The powder sorbent of Example 1 is added to the coal pre-combustion at 9.5% by weight. The liquid sorbent of Example 1 (50% calcium bromide in water) is injected post-combustion in the 1500° F.-2200° F. zone at a rate of 0.77%, based on the burn rate of the coal. Sulfur reduction is 56.89% and mercury reduction is 93.67%.

Example 6

Kentucky Blend Coal is prepared as in Example 1. The powder sorbent of Example 1 is added to the coal pre-combustion at 6% by weight. The liquid sorbent of Example 1 (50% calcium bromide in water) is injected post-combustion in the 1500° F.-2200° F. zone at a rate of 2.63%, based on the burn rate of the coal. Sulfur reduction is 54.91% and mercury reduction is 93.0%.

Although the invention has been set forth above with an enabling description, it is to be understood that the invention is not limited to the disclosed embodiments. Variations and modifications that would occur to the person of skill in the art upon reading the description are also within the scope of the invention, which is defined in the appended claims.

What is claimed is:

1. A method for reducing environmental emissions of mercury arising from combusting a mercury containing fuel in a furnace of a facility, wherein the facility comprises a convective pathway for combustion gases from the furnace, the method comprising:
    applying a sorbent composition comprising iodine and calcium onto the fuel;
    delivering the fuel into the furnace;
    combusting the fuel together with the applied sorbent composition to produce heat energy and combustion gases; and
    measuring the level of mercury in the combustion gases.

2. The method of claim 1, wherein the sorbent composition comprises calcium iodide.

3. The method of claim 1, wherein the sorbent composition comprises an iodide, an iodate, or a hypoiodite.

4. The method of claim 1, comprising applying 0.01-10% by weight of the sorbent composition, based on the weight of the fuel being burned.

5. The method of claim 1, wherein the sorbent composition further comprises silica and alumina.

6. The method of claim 5, wherein the sorbent composition comprises an aluminosilicate clay.

7. The method of claim 6, wherein the clay comprises kaolin.

8. The method of claim 6, wherein the clay comprises montmorillonite.

9. The method of claim 1, wherein the facility comprises a chemical scrubber disposed in the convective pathway.

10. The method of claim 9, wherein the chemical scrubber is a wet scrubber or an SCR control system.

11. The method of claim 1, wherein the facility comprises a particulate removal system disposed in the convective pathway.

12. The method according to claim 11, wherein the particulate removal system is an electrostatic precipitator.

13. The method according to claim 11, wherein the particulate removal system is a bag house.

14. The method of claim 1, further comprising applying a mercury sorbent composition comprising a halogen into the combustion gases where the temperature is between 1500° F. and 2700° F.

15. The method of claim 14, wherein the mercury sorbent composition comprises an organic bromine compound.

16. The method of claim 14, wherein the mercury sorbent composition comprises a bromide salt, a bromate salt, or a hypobromite salt.

17. The method of claim 14, wherein the mercury sorbent composition comprises an iodide salt, and iodate salt, or a hypoiodite salt.

18. The method of claim 1, wherein the fuel is coal.

19. A method of reducing emissions of mercury to a desired level, the emissions arising from combustion of mercury containing coal in the furnace of a facility comprising a convective pathway for combustion gases, the method comprising:
    adding a sorbent composition onto the coal at an initial treat level;
    combusting the coal in the furnace to create heat energy and combustion gases;
    measuring the level of mercury in the combustion gases; and
    adjusting the treat level up or down as required to meet the desired emissions level;
    wherein the sorbent composition comprises calcium iodide.

20. The method of claim 19, wherein the initial treat level is in the range of 0.01-10% by weight of the coal being combusted.

* * * * *